US009489750B2

United States Patent
Yang et al.

(10) Patent No.: US 9,489,750 B2
(45) Date of Patent: Nov. 8, 2016

(54) EXPOSURE METERING BASED ON BACKGROUND PIXELS

(71) Applicant: QUALCOMM Incorporated, San Diego, CA (US)

(72) Inventors: Ruiduo Yang, San Diego, CA (US); Shuxue Quan, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/316,678

(22) Filed: Jun. 26, 2014

(65) Prior Publication Data
US 2015/0379740 A1    Dec. 31, 2015

(51) Int. Cl.
*H04N 5/235* (2006.01)
*G06T 11/00* (2006.01)
*G06T 5/50* (2006.01)
*H04N 5/243* (2006.01)

(52) U.S. Cl.
CPC ............... *G06T 11/001* (2013.01); *G06T 5/50* (2013.01); *H04N 5/2351* (2013.01); *H04N 5/2353* (2013.01); *H04N 5/243* (2013.01); *G06T 2207/10024* (2013.01)

(58) Field of Classification Search
CPC .................................................... H04N 5/2351
USPC ....................................... 348/222.1; 396/153
See application file for complete search history.

(56) References Cited

U.S. PATENT DOCUMENTS

| 7,352,393 | B2 | 4/2008 | Sakamoto |
| 7,813,545 | B2 | 10/2010 | Ovsiannikov |
| 7,925,152 | B2 | 4/2011 | Lien et al. |
| 2007/0280551 | A1* | 12/2007 | Oztan ................ H04N 19/86 382/268 |
| 2008/0062275 | A1 | 3/2008 | Miyazaki |
| 2009/0310955 | A1* | 12/2009 | Lien ................... G03B 7/093 396/153 |
| 2011/0038535 | A1 | 2/2011 | Wang et al. |
| 2011/0249961 | A1 | 10/2011 | Brunner |
| 2012/0301125 | A1 | 11/2012 | Ashida |
| 2013/0002941 | A1 | 1/2013 | Park et al. |
| 2014/0168463 | A1* | 6/2014 | Tamura ............... H04N 9/735 348/223.1 |

OTHER PUBLICATIONS

Partial International Search Report—PCT/US2015/034860—ISA/EPO—Dec. 14, 2015.
International Search Report and Written Opinion—PCT/US2015/034860—ISA/EPO—Feb. 22, 2016.

* cited by examiner

*Primary Examiner* — Joel Fosselman
(74) *Attorney, Agent, or Firm* — Knobbe Martens Olson & Bear, LLP

(57) ABSTRACT

The disclosed technology relates to image-capturing methods. In one aspect, a method includes receiving an image frame comprising a plurality of pixels and subtracting foreground pixels from the image frame to obtain background pixels. The method additionally includes determining an exposure condition for a next image frame based on at least a subset of the background pixels. The method further includes adjusting the foreground pixels such that a difference between a background luma value and a foreground luma value of the next image frame is within a predetermined range. Aspects are also directed to apparatuses configured for the methods.

24 Claims, 12 Drawing Sheets

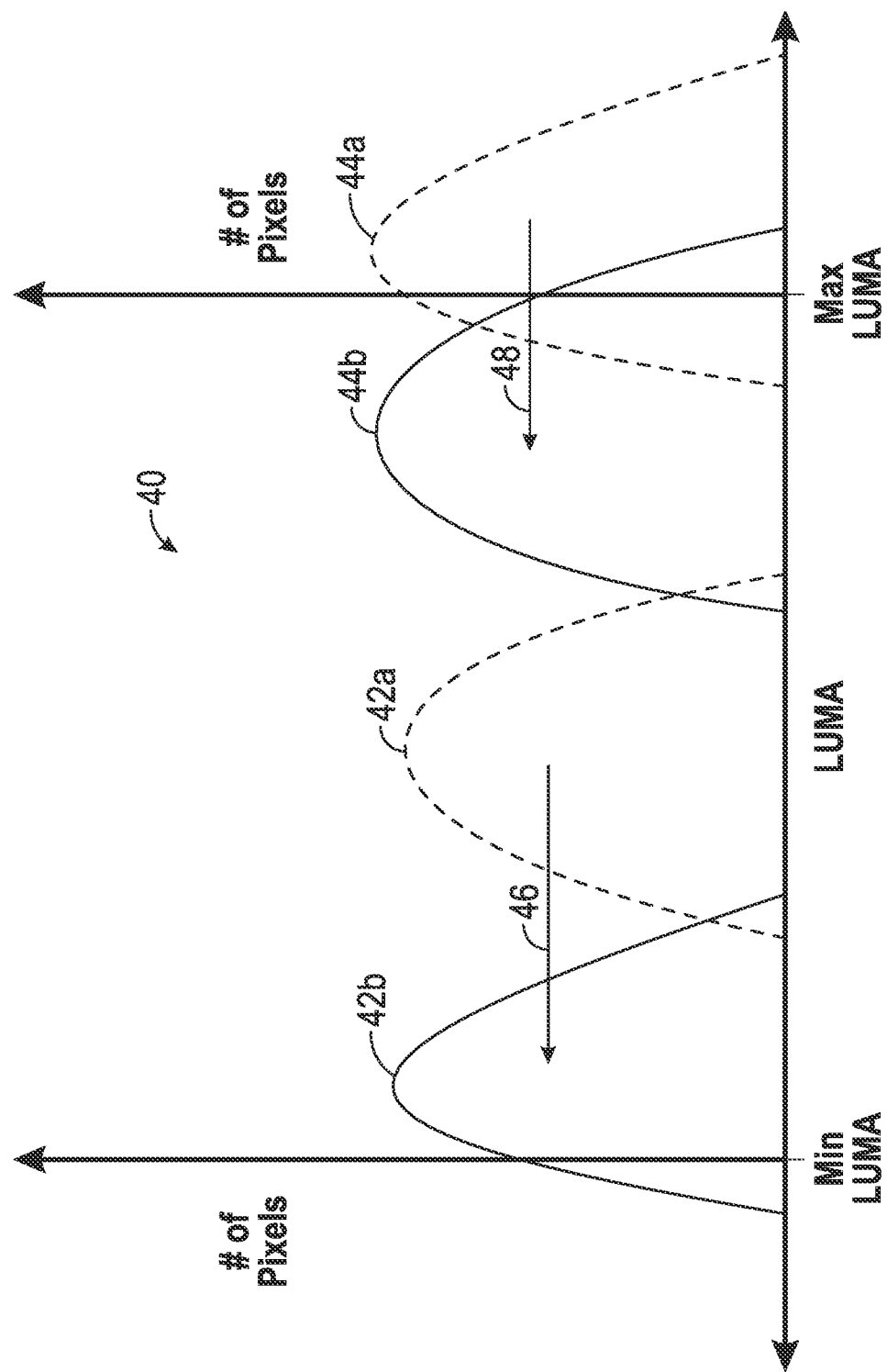

EXPOSURE METERING BASED ON BACKGROUND PIXELS

BACKGROUND OF THE INVENTION

1. Field of the Invention

The disclosed technology generally relates to image-capturing methods, and more particularly to exposure metering methods for providing foreground and background of image frames that have stable and balanced brightness values. Aspects are also directed to apparatuses configured for the methods.

2. Description of the Related Art

Some digital imaging apparatuses, e.g., digital camcorders are equipped with auto exposure metering processes to enhance the visual effect of the images taken. The exposure metering processes are designed to continuously determine and adjust exposure conditions to be used by an image sensor of the digital imaging apparatus. The exposure conditions are determined by parameters including, among other parameters, time, gain, and aperture (f-number). Many digital images that are generated using conventional exposure metering processes can have unbalanced relative brightness values between an image foreground (e.g., an image subject) and an image background (e.g., the image minus the image subject). That is, one of the foreground or the background may appear unrealistically bright or "washed out" compared to actual human visual experience, while the other of the foreground or the background may appear unrealistically dark compared to actual human visual experience. For example, when a digital image of a person's face is taken against a background of a rising or a setting sun at a beach, the background may be washed out, while the foreground (i.e., the person's facial features) appears overly dark. On the other hand, in an opposite-type situation, such as when a digital image of a person's face is taken using a flash against a background of an evening party, the foreground (i.e., the facial features) may be washed out, while the background appears overly dark.

Such an imbalance between the foreground and the background of the image frames can sometimes be attributed to an exposure metering process that controls the exposure conditions of the digital imaging apparatus. Generally, exposure conditions are determined parameters including, among other parameters, the aperture, the shutter speed, and ISO speed. The aperture controls the area over which light can enter the image sensor of the digital imaging apparatus. The shutter speed controls the duration of exposure of the image sensor. The ISO speed controls the sensitivity of the image sensor to a given amount of light. While different combinations of the aperture, the shutter speed and the ISO speed can be used to achieve the similar exposure, different trade-offs can exist with the different combinations. This is because the aperture can affect the depth of field, the shutter speed can affect the motion blur and the ISO speed can affect the image noise. Some digital imaging apparatuses are equipped with standardized metering processes that autoselect some or all of the aperture, the shutter speed, and ISO speed.

Some digital imaging apparatuses are equipped with one or more exposure metering options, many of which work by assigning a relative weighting to different light regions. For example, in partial or spot metering, a relatively higher weight is assigned to a portion of the image, e.g., a face, to image the portion (e.g., the face) against a substantially brighter or darker background without rendering the portion overly dark or overly bright. However, while such metering processes may allow for a stable foreground (e.g., the face) with a desired brightness level by metering off at least a portion of the foreground, the metering processes still may not prevent the background from becoming overly bright or overly dark by the very exposure conditions that allow for the stable foreground with the desired brightness level.

SUMMARY OF THE INVENTION

In one aspect, a method includes receiving an image frame comprising a plurality of pixels and subtracting foreground pixels from the image frame to obtain background pixels. The method additionally includes determining an exposure condition for a next image frame based on at least a subset of the background pixels. The method further includes adjusting the foreground pixels such that a difference between a background luma value and a foreground luma value of the next image frame is within a predetermined range.

In another aspect, a digital imaging apparatus includes an image sensing module configured to receive an image frame comprising a plurality of pixels. The apparatus additionally includes a background determination module configured to subtract foreground pixels from the image frame to obtain background pixels. The apparatus additionally includes an exposure condition determination module configured to determine an exposure condition for a next image frame based on at least a subset of the background pixels. The apparatus further includes a foreground pixel adjustment module configured to selectively adjust the foreground pixels such that a difference between a background luma value and a foreground luma value of the next image frame is within a predetermined range.

In another aspect, a computer-readable medium comprises instructions that when executed cause a processor to perform the steps including receiving an image frame comprising a plurality of pixels; subtracting foreground pixels from the image frame to obtain background pixels; determining an exposure condition for a next image frame based on at least a subset of the background pixels; and adjusting the foreground pixels such that a difference between a background luma value and a foreground luma value of the next image frame is within a predetermined range.

In yet another aspect, a digital imaging apparatus includes a means for receiving an image frame comprising a plurality of pixels. The apparatus additionally includes means for subtracting foreground pixels from the image frame to obtain background pixels. The apparatus additionally includes means for determining an exposure condition for a next image frame based on at least a subset of the background pixels. The apparatus further includes means for adjusting the foreground pixels such that a difference between a background luma value and a foreground luma value of the next image frame is within a predetermined range.

BRIEF DESCRIPTION OF THE DRAWINGS

FIG. 1C are schematic luma histograms illustrating luma distributions of the image frames of FIGS. 1A and 2B.

DETAILED DESCRIPTION

Embodiments of the invention relate to systems and methods for providing balanced and stable foreground and background illumination of subjects in an image frame. In some embodiments, exposure metering processes are used to determine exposure conditions based on portions of the image frame that are more stable. For example, one portion may be one or more background portions of the image frame. Such auto exposure processes were found to provide more stable auto exposure conditions that were less susceptible to sudden changes in luminance. This is due to the fact that some selected portions of the image frame, such as the background of the image frame, change relatively less frequently compared to portions of the foreground. In addition, the disclosed exposure metering systems and processes may provide for balanced relative brightness between the foreground and the background by selectively adjusting the foreground portion of the image.

Figure 1A:
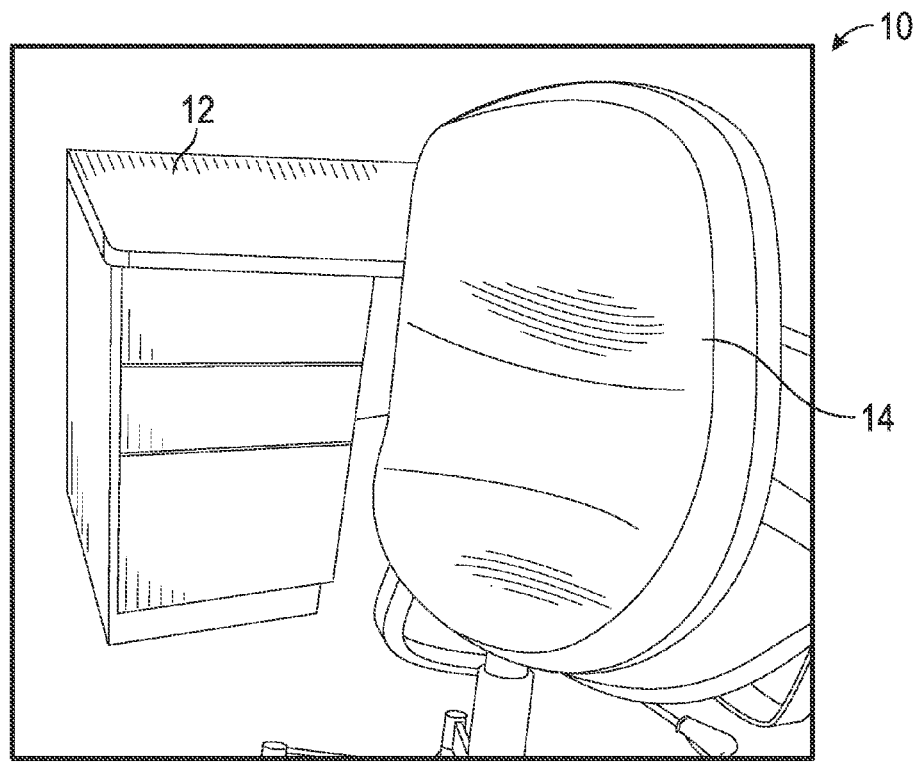
FIG. 1A is a schematic image frame captured by an imaging apparatus having subjects that reflect light relatively evenly.

FIG. 1A illustrates a first image frame 10 captured by the imaging apparatus under a first exposure condition determined by a conventional exposure metering process. The first image frame 10 illustrates multiple subjects, including a desk 12 and a chair 14 that are placed under a typical lighting environment, such as in an office in which the desk 12 and the chair 14 receive and reflect an incident light from, for example, a fluorescent ceiling light. As shown, the illumination of the desk 12 and the chair 14 are roughly equivalent and balanced within the image frame.

Figure 1B:
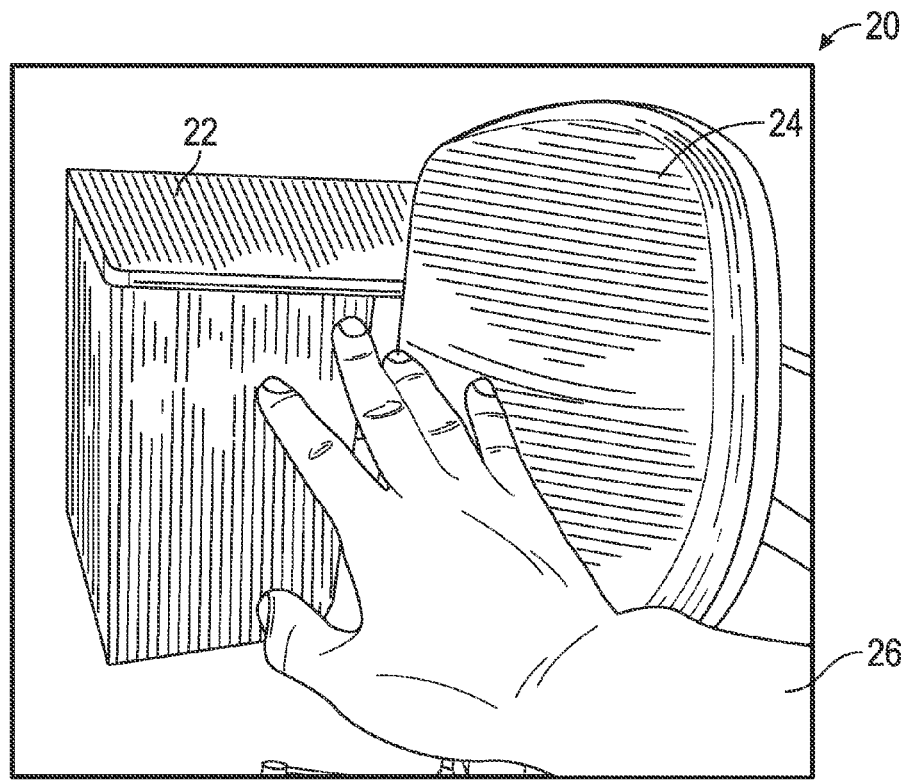
FIG. 1B is a schematic image frame captured by an imaging apparatus having subjects that reflect light relatively unevenly.

FIG. 1B illustrates a second image frame 20 captured by the image apparatus under a second exposure condition determined by the conventional exposure metering process. In addition to a desk 22 and a chair 24, the second image frame 20 illustrates a hand 26 in the foreground that has been newly captured in the frame. Because the hand 26 is closer to the image capture device, the hand 26 can reflect a substantially higher amount of light compared to the desk 22 and the chair 24, and therefore appears much brighter in the image frame 20. To accommodate the relatively bright hand 26 as well as the relatively dark desk and 22 and 24, a conventional exposure metering process may adjust the second exposure condition of FIG. 1B to be different from the first exposure condition shown in FIG. 1A. As a result of the adjustment, the hand 26 may be rendered overly bright while the desk 22 and the chair 24 are rendered overly dark. This effect can be further understood with respect to the histogram of FIG. 1C.

FIG. 1C illustrates a schematic luma histogram 40 of the pixels that corresponds to subjects in the first and second image frames 10 and 20 of FIGS. 1A and 1B that are captured by the imaging apparatus using the first and second exposure conditions, respectively. The x-axis represents the luma value of the pixels captured by the imaging apparatus and the y-axis represents the number of pixels having the corresponding luma value. In FIG. 1C and throughout the specification, a range of available luma values, which can be dependent on the particular imaging apparatus, can be represented on the x-axis as the range between a MIN LUMA value corresponding to the lowest luma value within the pixels and a MAX LUMA value corresponding to the highest luma value within the pixels. For example, for an image frame captured by the imaging apparatus having a bit-depth of 8 bits, the MIN LUMA value can correspond to 0 and the MAX LUMA value can correspond to 255. Of course, the MAX LUMA can be higher or lower, e.g., 16, 65536, 16777216, etc., corresponding to bit-depths of 4, 16, 24 bits, etc., depending on the availability of gray levels for the particular imaging apparatus.

It will be appreciated that overexposed pixels having luma values exceeding the MAX LUMA may not be further distinguished from pixels having a luma value of MAX LUMA, and thus the luma values of the corresponding pixels may be lost from the image frame and not be recovered. Such pixels may be displayed as being solid white, for example. Similarly, underexposed pixels having luma values below the MIN LUMA may not be further distinguished from pixels having a luma value of MIN LUMA, and the luma values of the corresponding pixels may be lost and thus the pixels may be displayed as being solid black, for example.

FIG. 1C illustrates a first distribution of pixels 42a corresponding to the desk 12 and the chair 14 of the first image frame 10 in FIG. 1A, obtained under the first exposure condition. FIG. 1C additionally illustrates a second distribution of pixels 44a corresponding to the hand (not displayed in FIG. 1A) that would have been obtained under the first exposure condition used to obtain the first image frame 10. FIG. 1C additionally illustrates a third distribution of pixels 42b corresponding to the desk 22 and the chair 24 obtained under the second exposure condition used to obtain the second image frame 20, and a fourth distribution of pixels 44b corresponding to the hand 26 obtained under the second exposure condition used to obtain the second image frame 20 (FIG. 1B). Under the conventional metering process, the first and third distributions 42a and 42b may be classified as the background, and the second and fourth distributions 44a and 44b may be classified as the foreground. In the illustrated example in FIG. 1C and throughout the specification, for illustrative purposes only, histograms may be depicted as having particular shapes. However, it will be understood that the histograms can have any shape based on the luma values of the pixels.

As illustrated, the luma values of the pixels within the second distribution 44a corresponding to pixels that would be obtained for the hand is substantially higher than the luma values of the pixels within the first distribution 42a corresponding pixels that have been obtained for the desk 12 and the chair 14 in FIG. 1A. That is, if the first exposure condition used to obtain the first image frame 10 is used to obtain an image frame including the hand, a significant fraction of pixels within the second distribution of pixels 44a would have luma values exceeding the MAX LUMA. As described above, when this occurs, the pixels whose luma values exceed the MAX LUMA can become "clipped" wherein the luma values over the MAX LUMA threshold are set to the MAX LUMA value. Thus, to minimize such losses, the conventional metering process may adjust the exposure condition from the first exposure condition to the second exposure condition. For example, the process may increase the shutter speed of the capture device. As a result, the pixels of the second distribution 44a are shifted to have lower luma values within the fourth distribution 44b, as indicated by an arrow 48, such that the proper luma values of more pixels corresponding to the hand can be included within the available luma range. However, as a result of such an adjustment in the exposure condition, luma values for pixels of the first distribution 42a are also shifted to lower luma values within the third distribution 42b, as indicated by an arrow 46, which may cause an undesirable darkening of the desk 22 the chair 24, as illustrated in FIG. 1B. Under some circumstances, a fraction of the pixels within the third distribution 42b having luma values below MIN LUMA may be clipped such that the lower luma values of those pixels are set to the MIN LUMA value.

Figure 2A:
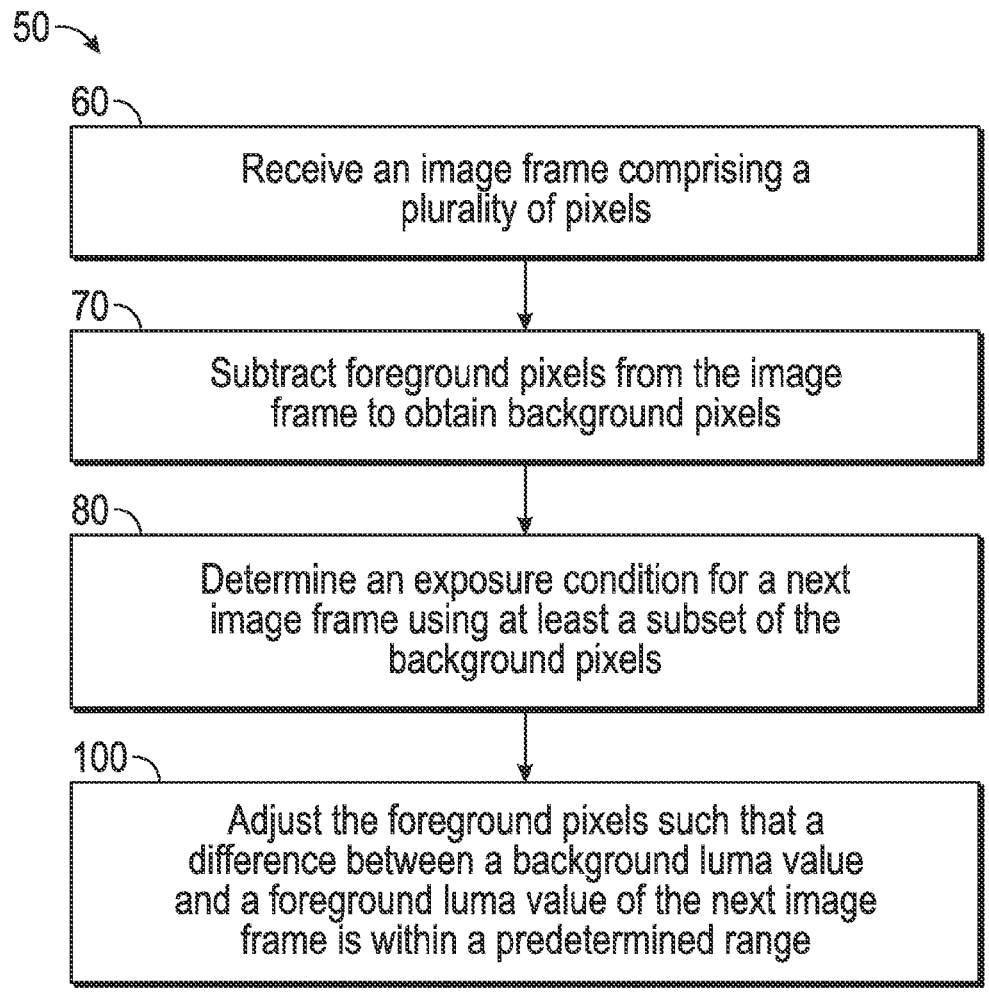
FIG. 2A is a flow chart illustrating a method of capturing an image frame, according to some embodiments.

FIG. 2A is a flow chart illustrating a method 50 of capturing an image frame, using an exposure metering process according to some embodiments. The method 50 begins by receiving an image frame comprising a plurality of pixels at a state 60. The plurality of pixels may comprise background pixel regions and foreground pixel regions. Upon receiving the plurality of pixels at the state 60, the method 50 proceeds to classify a subset of the pixels as foreground pixels. The method 50 includes, after classifying the subset of the pixels into foreground pixels, subtracting the foreground pixels from the image frame to obtain background pixels at a state 70. The method 50 includes, after subtracting to obtaining the background pixels at the state 70, determining an exposure condition for a next image frame using at least a subset of the background pixels at a state 80. The at least a subset of the background pixels, compared to other pixels within the image frame, changes relatively less frequently, such that the exposure conditions are more stable and less subject to over-adjustments that render the foreground or the background of the image frame overly dark or overly bright. The method 50 additionally includes adjusting the foreground pixels such that a difference between a background luma value and a foreground luma value of the next image frame is within a predetermined range at a state 100, such that in addition to having more stable exposure conditions as a result of determining the exposure condition using at the state 80, the next image frame has a foreground that is adjusted to have more balanced brightness relative to the background.

Figure 2B:
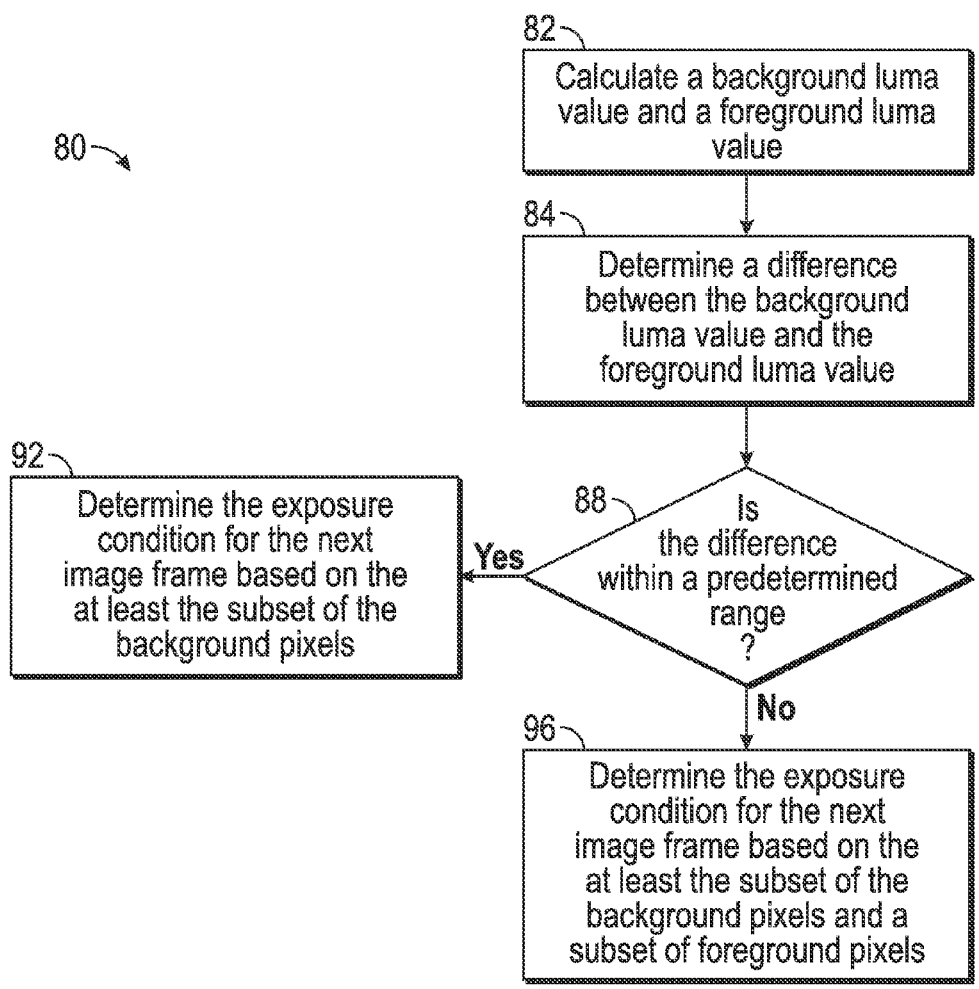
FIG. 2B is a flow chart illustrating a method of determining an exposure condition according to some embodiments.

FIG. 2B is a flow chart illustrating a method 80 of determining an exposure condition according to some embodiments. In particular, the method 80 may correspond to the state 80 of FIG. 2A, and illustrates more in detail the process of determining an exposure condition for a next image frame using at least a subset of the background pixels. The method 80 of determining the exposure condition comprises, after subtracting the foreground pixels from the received image frame to obtain the background pixels at the state 70 (FIG. 2A), calculating a background luma value and a foreground luma value at a state 82. Calculating the background and foreground luma values can comprise calculating, for example, an average, a median, a mode, a minimum or a maximum of luma values of the foreground or background pixels, among other suitable luma values. It will be appreciated that, while the accuracy of such calculations may be higher when substantially all of the foreground pixels and substantially all of the background pixels are used, in some cases it may be desirable to use a subsample of the foreground and background pixels in some implementations to increase the speed of the calculations. After calculating the background and foreground luma values at the state 82, the method 80 proceeds to determine a difference between the background and foreground luma values at a state 84. In some embodiments, upon determining that the difference within a predetermined range at a decision state 88, the method proceeds to a state 92 to determine the exposure condition for the next image frame based on the at least the subset of the background pixels. Such may be the case, for example, when the difference between background and foreground luma values is relatively small such that the exposure condition for the next image can be determined based substantially solely on background pixels without overexposing or underexposing the foreground. In some other embodiments, upon determining that a difference between a background luma value and a foreground luma value is outside the predetermined range at the decision state 88, the method proceeds to a state 96 to determine the exposure condition for the next image frame based on the at least the subset of the background pixels and additionally based on a subset of foreground pixels. Such may be the case, for example, when the difference between background and foreground luma values is relatively large such that the exposure condition for the next image is determined based on a combination of background and foreground pixels such that overexposure or underexposure of the foreground can be minimized.

Figure 2C:
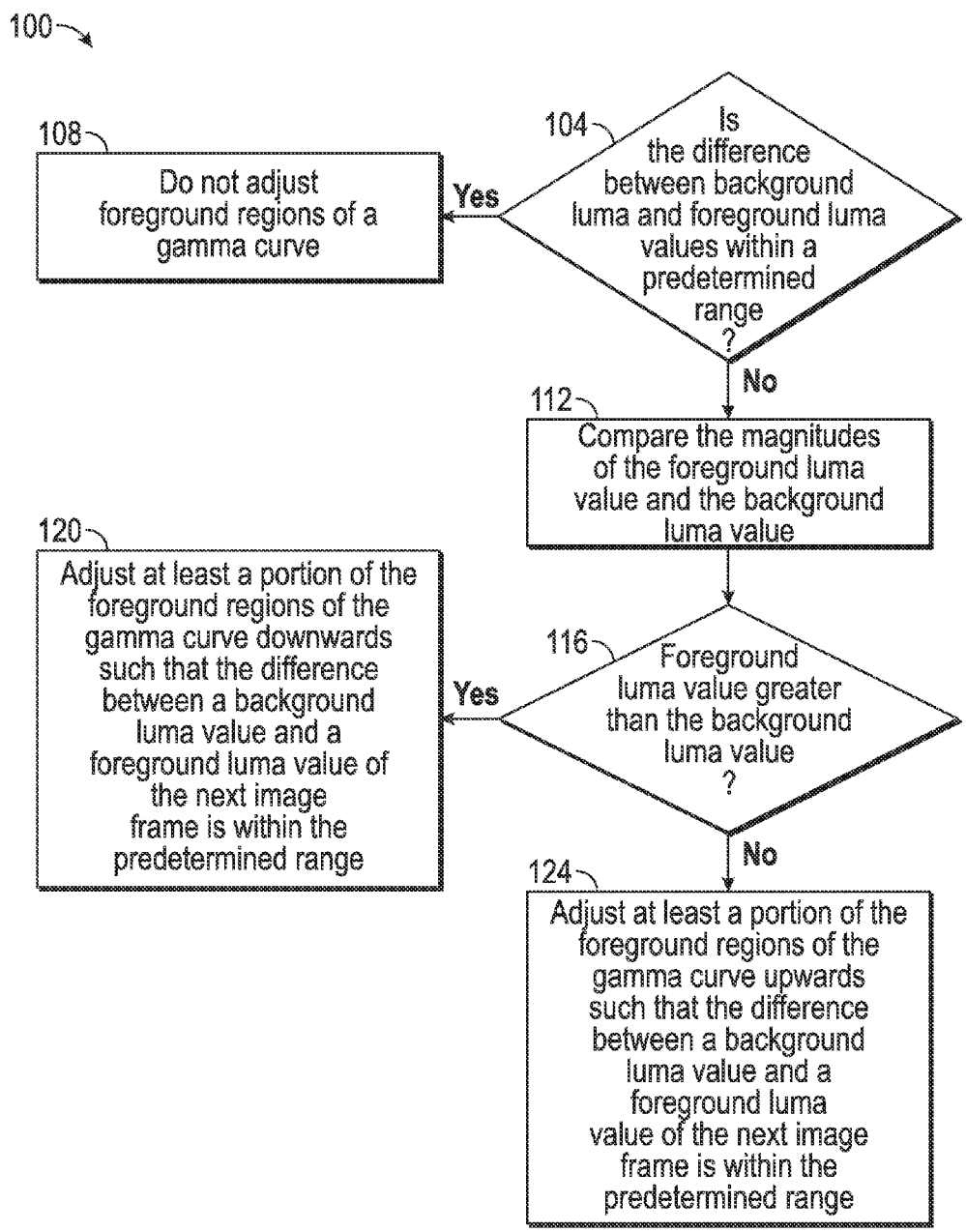
FIG. 2C is a flow chart illustrating a method of selectively adjusting foreground pixels according to some embodiments.

FIG. 2C is a flow chart illustrating a method 100 of selectively adjusting foreground pixels according to some embodiments. The method 100 may correspond to the state 100 of FIG. 2A, and illustrates more in detail the process of adjusting the foreground pixels such that a difference between a background luma value and a foreground luma value of the next image frame is within a predetermined range. The method 100 of adjusting the foreground pixels includes determining at a decision state 104 whether the difference between the background and foreground luma values determined at the state 84 (FIG. 2B) is greater than a predetermined value. If the calculated difference is determined at the decision state 104 to be within a predetermined range, the foreground regions of a gamma curve of the image frame is not adjusted at a state 108. On the other hand, if the calculated difference is determined to be greater than the predetermined range at the decision state 104, the method proceeds to compare the magnitudes of the foreground luma value and the background luma value at a state 112. If the foreground luma value is determined to be greater than the background luma value at a decision state 116 (i.e., brighter foreground), the method proceeds to a state 120 to adjust at least a portion of the foreground regions of the gamma curve downwards such that the difference between a background luma value and a foreground luma value of the next image frame is reduced to be within the predetermined range. On the other hand, if the foreground luma value is determined to be less than the background luma value at the decision state 116, the method proceeds to a state 124 to selectively adjust at least a portion of the foreground regions of the gamma curve upwards such that the foreground luma value is adjusted upwards such that the difference between a background luma value and a foreground luma value of the next image frame increased to be within the predetermined range.

Embodiments of the method 50 of capturing an image frame, using an exposure metering process according to some embodiments as illustrated in FIGS. 2A-2C, are described more in detail below with respect to FIGS. 3A, 3B, 4A, 4B and 5A-5D. In the following, for illustrative purposes only, graphs containing data such as histograms or gamma curves may be depicted as having schematic shapes. However, it will be understood that the graphs can have any shape depending on the nature of the image.

Figure 3A:
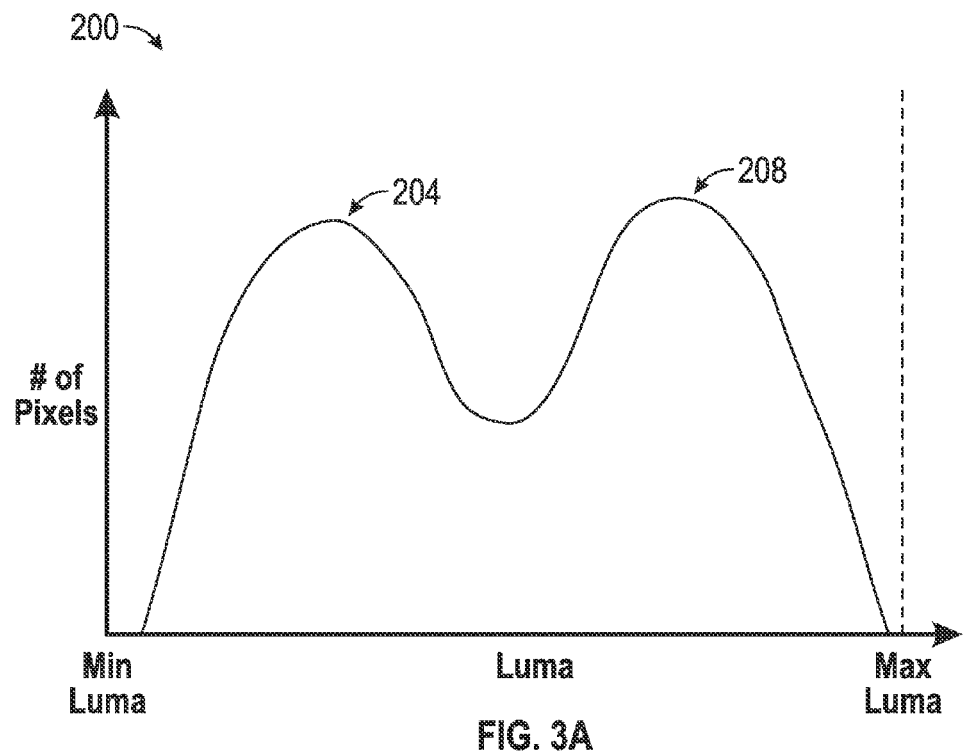
FIGS. 3A-3B are schematic luma histograms illustrating a method of determining an exposure condition according to some embodiments.
Figure 3B:
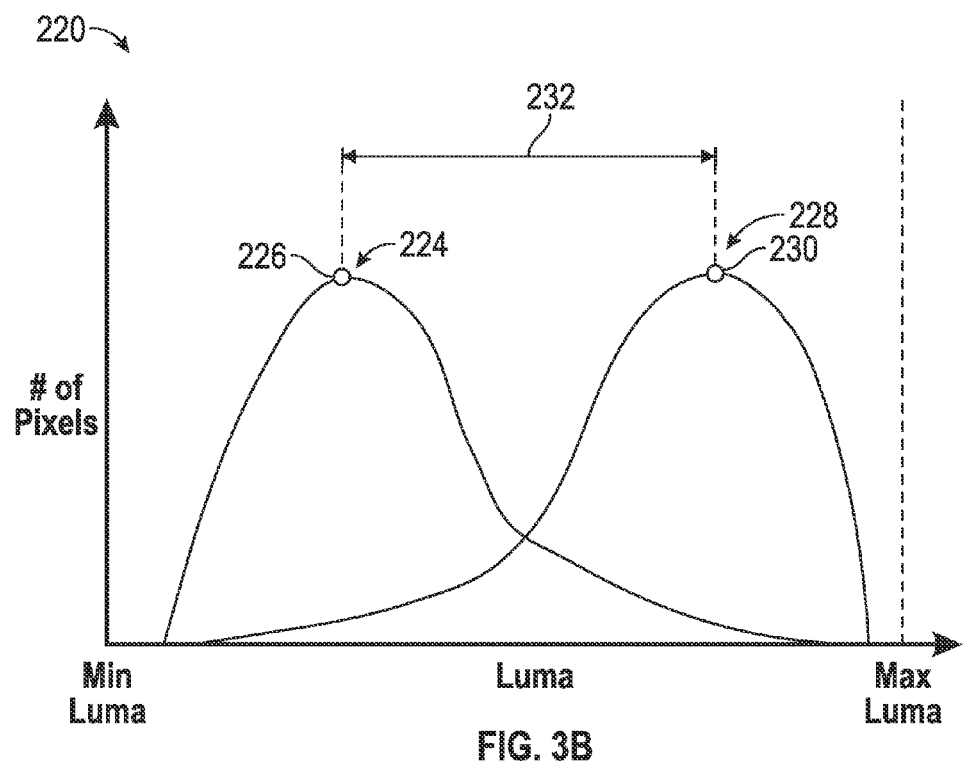

FIGS. 3A and 3B illustrate schematic luma histograms associated with determining exposure conditions using the background of the image frame, according to some embodiments. In particular, the embodiments illustrate receiving the image frame, obtaining background pixels, and determining an exposure condition according to the method similar to that described above with respect to FIGS. 2A and 2B, where an initial difference between luma values of the foreground and background is relatively small. In FIGS. 3A and 3B, the x-axis represents the luma values of the pixels captured by the imaging apparatus having a range between MIN LUMA and MAX LUMA, and the y-axis represents the number of pixels having the corresponding luma values.

FIG. 3A illustrates a luma histogram 200 of an image frame comprising a background pixel region 204 and a foreground pixel region 208. The pixels of the luma histogram 200 can be classified into background pixels and foreground pixels using a background subtraction model. The background subtraction model according to some embodiments includes classifying pixels as background or foreground pixels by detecting foreground pixels using a mathematical process, and subtracting the foreground pixels from the image frame to obtain background pixels. In some embodiments, the foreground detection can be based on detection of motion of a subject. In these embodiments, two successive image frames can be compared to determine, based on a mathematical model, changes in locations of some subjects, and classify subjects that have moved by more than a predetermined distance within the image frame to be foreground pixels. The mathematical models can use, for example, a median or an average value of a histogram. Some other models can use, for example, Gaussian or a mixture of Gaussians or a Kernel Density Estimation. Yet some other models can use, for example, a filtering technique. The mathematical models can use certain features for modeling the background and for detecting the foreground including, for example, spectral features (e.g., color features), spatial features (e.g., edge features, texture features or stereo features), and temporal features (e.g., motion features).

In embodiments where foreground detection is based on detection of motion, subtracting foreground pixels from the image frame comprises identifying a foreground subject of the image frame, predicting a movement path of the foreground object, and subtracting pixels corresponding to the foreground subject sweeping through the movement path. Predicting the movement path, for example, can include determining a velocity including the direction and speed based on extrapolation of one or more prior image frames.

FIG. 3B illustrates a luma histogram 220 of the image frame after classifying the pixels into foreground pixels 228 and subtracting the foreground pixels 228 from the image frame 200 to obtain the background pixels 224, according to some embodiments.

Once the background pixels 224 and the foreground pixels 228 are obtained as illustrated in FIG. 3B, a background luma value and a foreground luma value are determined. The background and foreground luma values can comprise an average, a median, a mode, a minimum, a maximum or a peak of luma value of the respective foreground and background pixels 228 and 224, among other suitable luma values. In FIGS. 3A and 3B, for illustrative purposes, the respective foreground and background luma values correspond to peak luma values 230 and 226 of the respective foreground and background pixels 228 and 224, respectively.

After determining the background and foreground luma values 226 and 230, a difference 232 between the background and foreground luma values 226 and 230 can be determined. The difference 232 can then be compared against a predetermined range. By way of an example only, the predetermined range can correspond to, for example, a percentage of the range of available luma values (i.e., MAX LUMA-MIN LUMA). It will be appreciated that the percentage of the range of available luma values can be chosen to prevent saturation of the foreground or the background, and the chosen percentage can depend on factors such as the sensitivity of the sensor being used. For example, for a relatively high sensitivity sensor (12 bit or higher), the predetermined range can correspond to about 60% of the available luma range, about 70% of the available luma range, or about 80% of the available luma range. For example, for a relatively low sensitivity sensor (8 bit or 10 bit), the predetermined range can correspond to about 40% of the available luma range, about 50% of the available luma range, or about 60% of the available luma range, although other percentages are contemplated.

In the illustrated embodiment of FIG. 3B, the difference 232 may be less than a predetermined range. In these embodiments, the exposure condition for the next image frame is determined based on at least a subset of the background pixels 226. In some embodiments, the exposure condition for the next image frame is determined based on the at least the subset of the background pixels 226 which does not include any foreground pixels.

At least the subset of the background pixels can be selected based on the variety of techniques. In some embodiments, the subset of the background pixels can be selected based on a location within the image frame. For example, the background pixels may be selected based on a fraction of pixels located near the center, or a fraction of pixels located near the periphery. In some other embodiments, the subset can be selected based on a particular subject within the background (e.g., the desk or the chair in FIGS. 1A and 1B). In some other embodiments, the subset can be selected based on the relative luma values. In this context, the relative luma values may include an upper or lower percentage of background pixels based on their luma values. In some other embodiments, the selected subset can be a percentage of background pixels that are selected randomly. In yet some other embodiments, the exposure condition for the next image frame is determined based on a percentage of a background image area occupied by the background pixels 226. For example, the selected subset of the background pixels can include a subset of pixels selected from, for example, 90%, 95%, 98%, 99% or more of the background image area occupied by the background pixels 226. It will be appreciated that the background image area and/or the percentage of pixels within the background image area can be selected based on the desired speed and accuracy of the calculations.

Figure 4A:
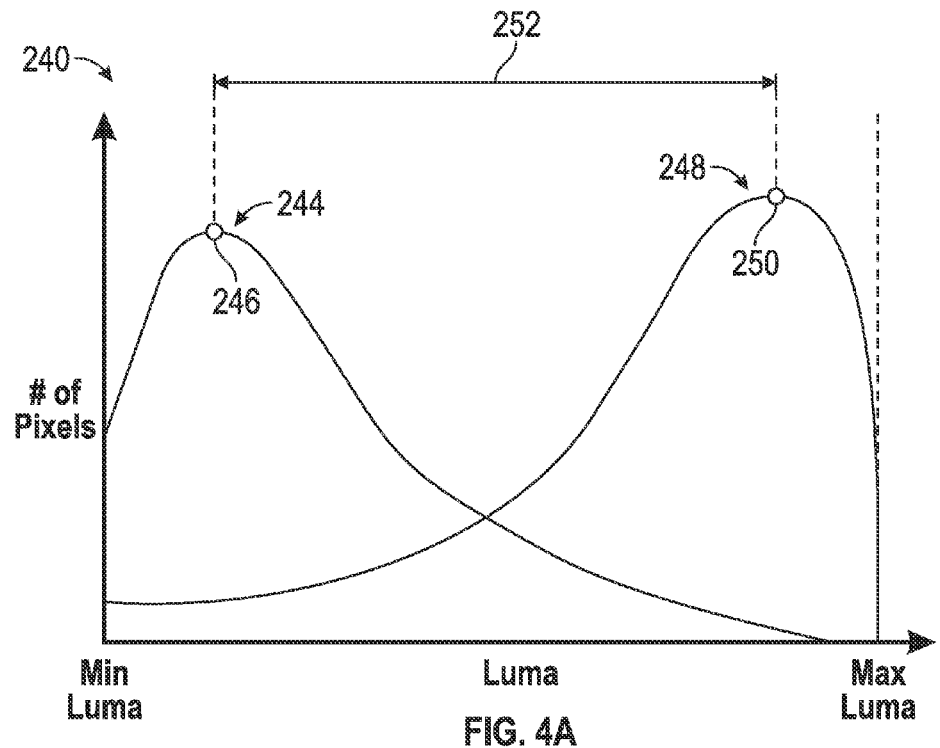
FIGS. 4A-4B are schematic luma histograms illustrating a method of determining an exposure condition according to some other embodiments.
Figure 4B:
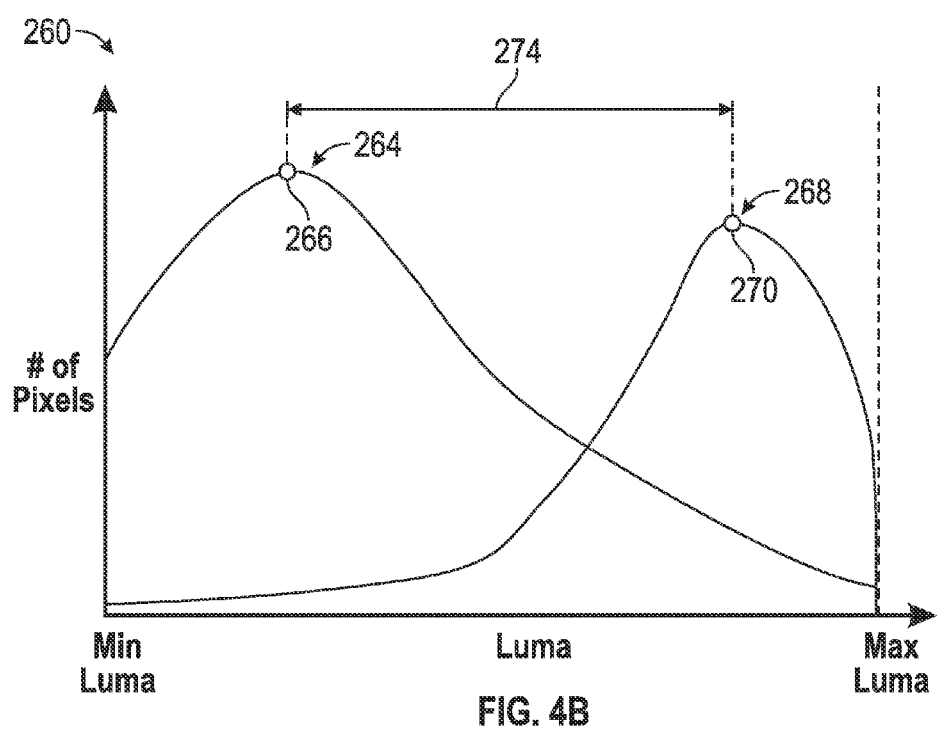

FIGS. 4A and 4B illustrate schematic luma histograms associated with determining exposure conditions using the background of the image frame, according to some embodiments. In particular, the embodiments illustrate receiving the image frame, obtaining background pixels, and determining an exposure condition according to the method similar to that described above with respect to FIGS. 2A and 2B, where a difference between luma values of the foreground and background is relatively large.

FIG. 4A illustrates a luma histogram 240 of an image frame after classifying the pixels into foreground pixels 248 and background pixels 244, according to another embodiment. The background pixels 244 and foreground pixels 248 are classified using methods similar to the methods described above with respect to FIGS. 3A and 3B. In addition, a background luma value 246, a foreground luma value 250, and an initial difference 252 between the background and foreground luma values 246 and 250 are determined using methods similar to the methods described above with respect to FIG. 3B. Similar to FIG. 3B, for illustrative purposes, the respective foreground and background luma values correspond to peak luma values 250 and 256 of the respective foreground and background pixels 248 and 244, respectively.

In contrast to the embodiment of FIG. 3B, in the illustrated embodiment of FIG. 4A, the initial difference 252 may be greater than a predetermined range described above with respect to FIG. 3B, where the predetermined range can correspond to, for example, a percentage of the range of available luma values (i.e., MAX LUMA-MIN LUMA). In these embodiments, the exposure condition for the next image frame is determined based on a subset of the background pixels 244 as described with respect to FIG. 3B. The subset of the background pixels can include pixels selected using similar methods as those described with respect to FIG. 3B. In addition, the exposure condition for the next image frame is determined based on a subset of foreground pixels 250.

Similar to the subset of background pixels, the subset of foreground pixels can also be selected based on similar techniques, such as, in some embodiments, based on a location within the image frame. Accordingly, a fraction of pixels located near the center or a fraction of pixels located near the periphery of the image can be selected. In some other embodiments, the subset of foreground pixels can be selected based on a particular subject within the foreground. As one example, the subset could be the hand as shown in FIG. 1B. In some other embodiments, the subset of foreground pixels can be selected based on their relative luma values. Thus, pixels having upper or lower percentage of foreground pixels can be selected based on their luma values. In some other embodiments, the subset of foreground pixels can be a percentage of foreground pixels that are selected randomly.

The result of including some foreground pixels in determining the exposure condition for the next image frame is illustrated in a luma histogram 260 in FIG. 4B. In the luma histogram 260, a resulting difference 274 between the background and foreground luma values 266 and 270 is smaller than the initial difference 252 of FIG. 4A. The smaller resulting difference 274 can be obtained, for example, when a subset of pixels having higher luma values from the foreground pixels 248 is added into the background pixels 244 of FIG. 4A such that an adjusted background pixels 264 has a higher luma value 266 compared to the luma value 246 of the background pixels 244 of FIG. 4A.

In FIGS. 3A and 3B and FIGS. 4A and 4B, embodiments in which the foreground of the image frame is brighter than the background of the image frame were described. However, it will be understood that analogous principles can be applied to embodiments where the foreground of the image frame is darker than the background of the image frame. In such embodiments, the exposure condition for a next image frame is determined based on at least a subset of the background pixels having higher luma values compared to the foreground pixels.

FIGS. 5A-5D are schematic luma histograms and gamma curves illustrating a method of selectively adjusting foreground pixels according to some embodiments, similar to the methods described above with respect to FIGS. 2A and 2C.

Figure 5A:
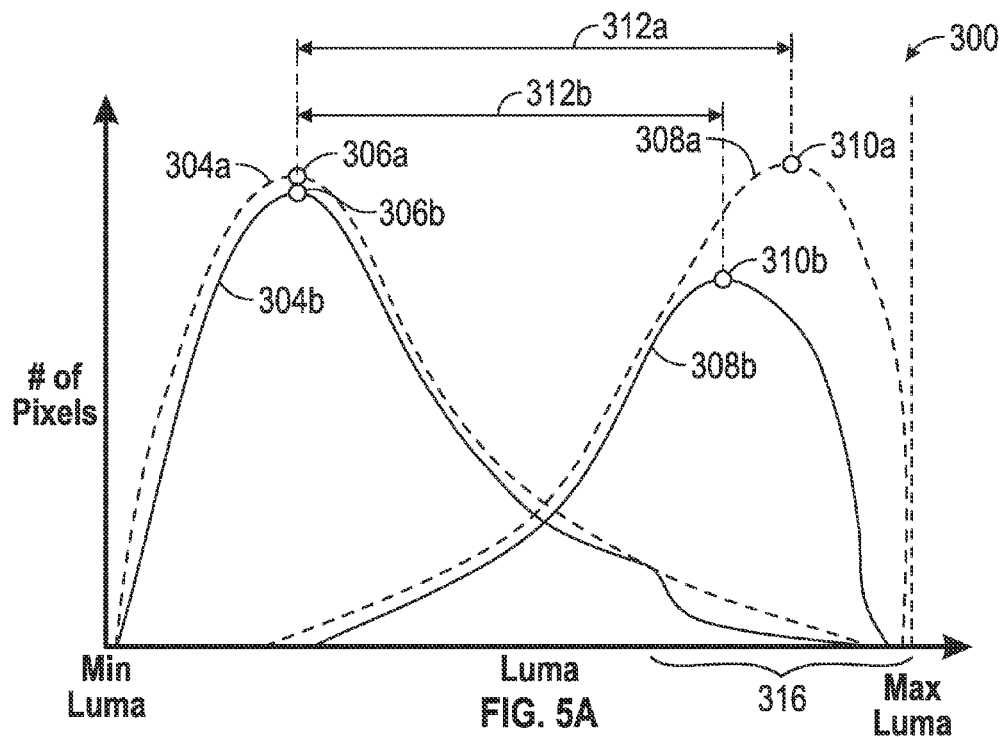
FIG. 5A is a schematic luma histogram illustrating a method of selectively adjusting foreground pixels according to some embodiments.

FIG. 5A illustrates schematic luma histograms 300 of image frames captured by an imaging apparatus, using an exposure metering process applied to image frames where the foreground is brighter than the background, according to some embodiments. In FIG. 5A, the x-axis represents the luma values of the pixels captured by the imaging apparatus having range between MIN LUMA and MAX LUMA, and the y-axis represents the number of pixels having the corresponding luma values.

Referring to FIG. 5A, the luma histograms 300 illustrate a first image frame including first background pixels 304a and first foreground pixels 308a, and a second image frame including second background pixels 304b and second foreground pixels 308b, according to some embodiments. The foreground and background pixels may be obtained from an undifferentiated image frame by applying background subtraction process described above with respect to FIGS. 3A and 3B. The first image frame can represent an initial image frame received from an image sensor under a first exposure condition, and the second image frame can represent a subsequent image frame received from the image sensor after the first exposure condition is modified to a second exposure condition in response to a change in the foreground subject. As described above with respect to FIGS. 3A and 3B, once the first foreground and background pixels 308a and 304a have been obtained, a first difference 312a between a first foreground luma value 310a of the first foreground pixels 308a and a first background luma value 306a of the first background pixel pixels 304a is determined, in a similar manner as described above.

Subsequently, as described above with respect to FIG. 2C, upon determining that the first foreground luma value 310a is greater than the first background luma value 306a, the luma values of the first foreground pixels 308a within an upper luma region 316 are adjusted downwards. The resulting second foreground pixels 308b has a reduced second foreground luma value 310b, such that the resulting second difference 312b between the second foreground luma value 310b and a second background luma value 306b of the second background pixel 304b is obtained, whose value is smaller than the first difference 312a. As a result, the risk of over-exposing the foreground is reduced.

The upper luma region 316 within which the foreground pixels are adjusted can be selected based on the variety of techniques, such as, in some embodiments, based on a location within the image frame (e.g., a fraction of pixels located near the center or a fraction of pixels located near the periphery). In some other embodiments, the upper luma region 316 can be selected based on a particular subject within the foreground (e.g., the hand in FIG. 1B). In some other embodiments, the upper luma region 316 can be selected based on the relative luma values, e.g., an upper percentage of foreground pixels based on their luma values. In some other embodiments, the upper luma region 316 can be chosen to be a percentage of foreground pixels that are selected randomly.

As described above with respect to FIGS. 3A and 3B, the background and foreground luma values 306a/306b and 310a/310b can comprise an average, a median, a mode, a minimum, a maximum or a peak of luma value of the respective background and foreground pixels 304a/304b and 308a/308b, among other suitable luma values. In FIG. 5A for illustrative purposes, the respective foreground and background luma values correspond to peak luma values.

Figure 5B:
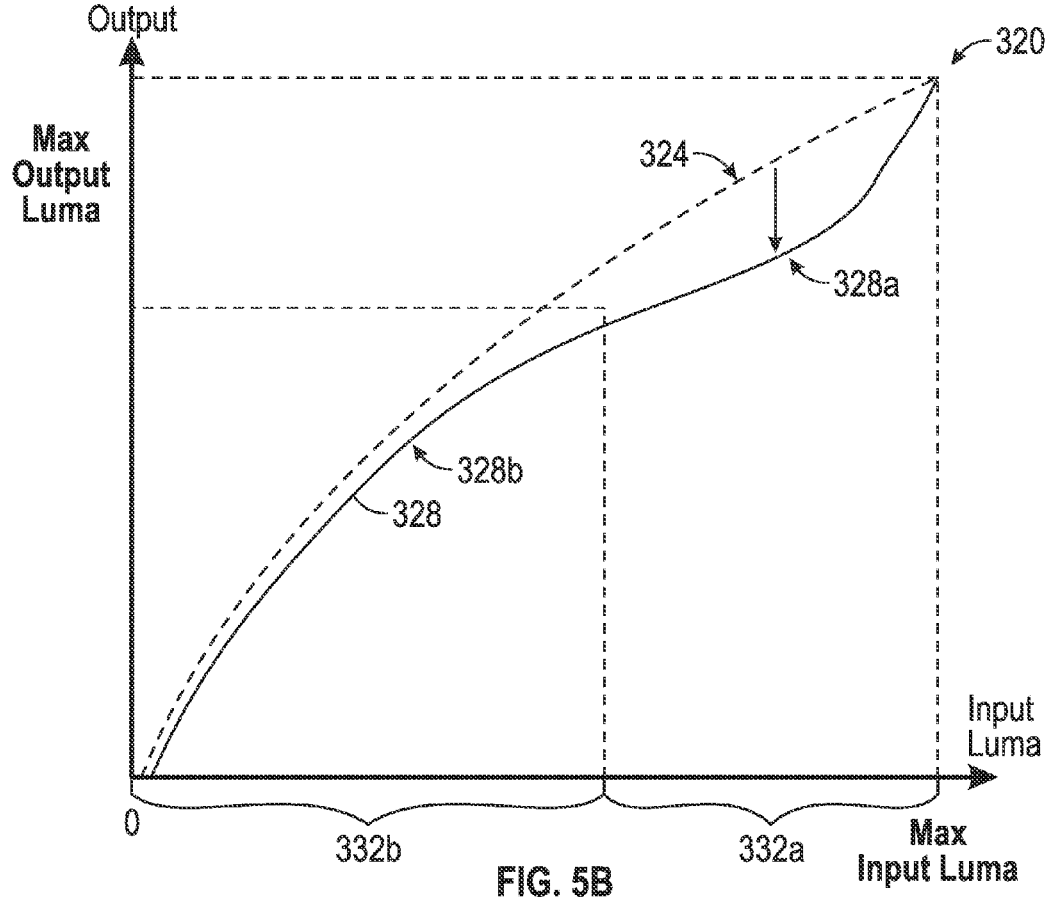
FIG. 5B is a graph showing a gamma adjustment curve corresponding to the method of selectively adjusting foreground pixels according embodiments illustrated in FIG. 5A.

FIG. 5B is a graph 320 showing a default gamma adjustment curve 324 and an adjusted gamma curve 328 corresponding to the method of selectively adjusting foreground pixels according to some embodiments. In the graph 320, the x-axis represents input luma values corresponding to a first image frame, and the y-axis represents output luma values corresponding to the second image frame. The default gamma curve 324 may not be a straight line. Instead, the default gamma curve 324 may have an overall curvature that may be optimized to adjust the overall image frame such that a mid-tone region of the image frame is adjusted for enhanced contrast. The default gamma curve 324 may not selectively adjust particular foreground regions.

The adjusted gamma curve 328 illustrates the adjustment in the foreground pixels that can be made using the exposure metering process similar to that used to adjust the foreground pixels in FIG. 5A. The adjusted gamma curve 328 includes an upper gamma curve region 328a corresponding to an upper luma region 332a of the pixels (the region between the smaller and larger dotted rectangles). The adjusted gamma curve 328 additionally includes a lower gamma curve region 328b corresponding to a lower luma region 332b of the pixels (the region inside the smaller dotted rectangle). As illustrated, the pixels within the upper luma region 332a are substantially adjusted downwards by the upper gamma curve region 328a, while the pixels within the lower luma region 332b are substantially unaffected by the lower gamma curve region 328b. As a result of the adjustment made according to the adjusted gamma curve 328, the first foreground pixels 308a (FIG. 5A) are selectively shifted to become the second foreground pixels 308b (FIG. 5A) having reduced luma values.

Figure 5C:
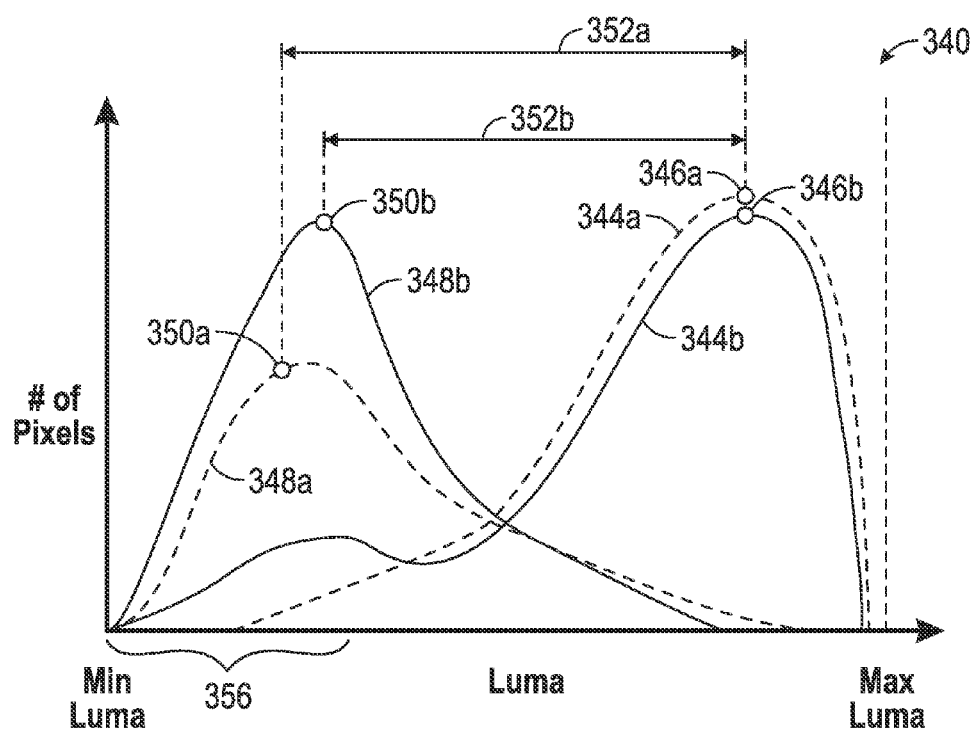
FIG. 5C is a schematic luma histogram illustrating a method of selectively adjusting foreground pixels according to some other embodiments.

FIG. 5C illustrates schematic luma histograms 340 of image frames captured by an imaging apparatus, using metering process applied to image frames where the foreground is darker than the background, according to some embodiments. In FIG. 5C, the axes and axes labels are similar to those described above with respect to FIG. 5A.

Referring to FIG. 5C, the luma histograms 340 illustrate a first image frame including first background pixels 344a and first foreground pixels 348a, and a second image frame including second background pixels 344b and second foreground pixels 348b, according to some embodiments. Similar to the luma histograms 300 described above with respect to FIG. 5A, the first image frame can represent an initial image frame received from the imaging apparatus under a first exposure condition, and the second image frame can represent a subsequent image frame received from the imaging apparatus after the exposure condition is modified to a second exposure condition in response to a change in the foreground subject. Similar to FIG. 5A, the foreground and background pixels may be obtained from an undifferentiated image frame by applying background subtraction process described above with respect to FIGS. 3A and 3B.

Also similar to FIG. 5A, once the first foreground pixels 348a and the first background pixels 344a have been obtained, a first difference 352a between a first foreground luma value 350a of the first foreground pixels 348a and a first background luma value 346a of the first background pixel pixels 344a is determined. Unlike FIG. 5A, however, the first difference 352a is a negative value, because the first foreground pixels 348a have lower luma values (i.e., the foreground is darker) compared to the first background pixels 344a. Subsequently, as described above with respect to FIG. 2C, upon determining that the first luma value 350a of the first foreground pixels 348a is lower than the first luma value 346a of the first background pixels 344a, the luma values of the first foreground pixels 348a within a lower luma region 356 are selectively adjusted upwards. The resulting second foreground pixels 348b have an increased second foreground luma value 350b, such that the resulting second difference 352b between the second foreground luma value 350b and a second background luma value 346b of the second background pixel 344b is obtained, whose value is smaller than the first difference 352a. As a result, the risk of under-exposing the foreground is reduced.

Figure 5D:
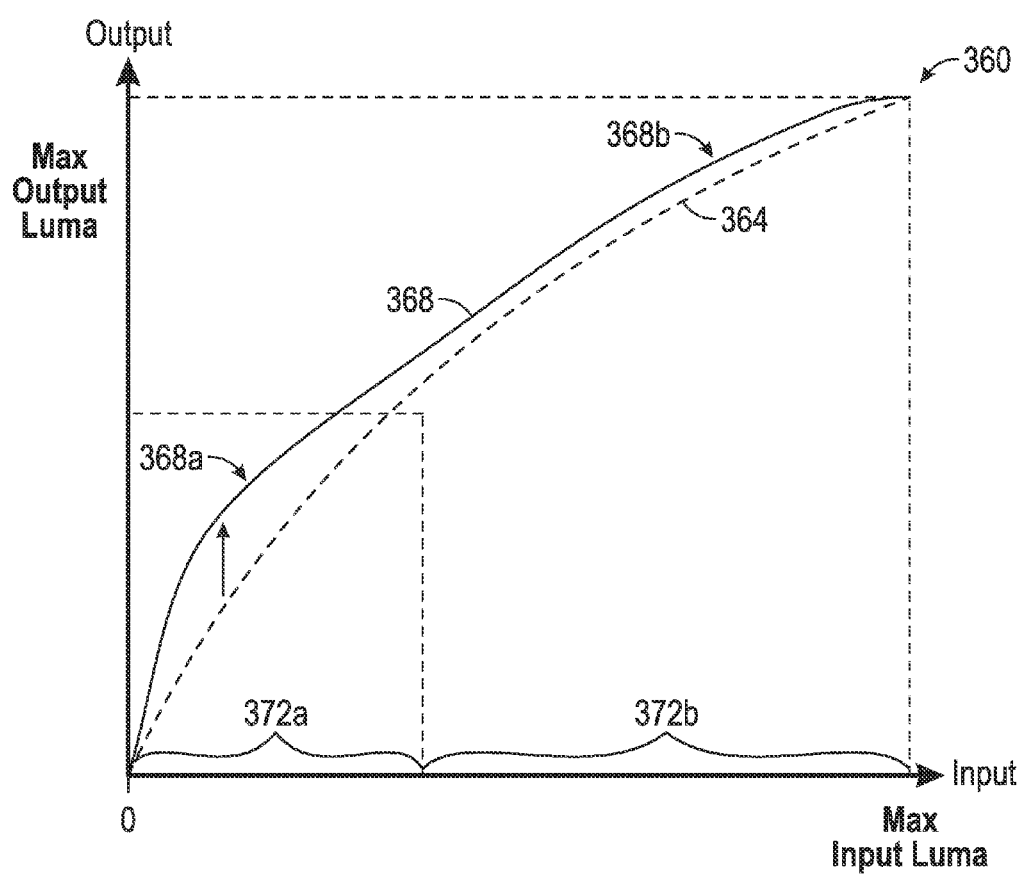
FIG. 5D is a line graph showing a gamma adjustment curve corresponding to a method of selectively adjusting foreground pixels according embodiments illustrated in FIG. 5C.

FIG. 5D is a graph 360 showing a default gamma adjustment curve 364 and an adjusted gamma curve 368 corresponding to the method of selectively adjusting foreground pixels according to some embodiments. In the graph 360, the x-axis represents input luma values corresponding to a first image frame, and the y-axis represents output luma values corresponding to the second image frame. Similar to FIG. 5B, it will be appreciated that the default gamma curve 364 may not be a straight line.

The adjusted gamma curve 368 illustrates the adjustment in the foreground pixels that can be made using the exposure metering process similar to that used to adjust the foreground pixels in FIG. 5D. The adjusted gamma curve 368 includes lower gamma curve region 368a corresponding to a lower luma region 372a of the pixels (the region within the smaller dotted rectangles). The adjusted gamma curve 368 additionally includes an upper gamma curve region 368b corresponding to an upper luma region 372b of the pixels (the region between smaller and larger dotted rectangles). As illustrated, the pixels within the lower luma region 372a are substantially adjusted upwards by the lower gamma curve region 368a, while the pixels within the upper luma region 372b are substantially unaffected by the upper gamma curve region 328b. As a result of the adjustment made according to the adjusted gamma curve 368, the first foreground pixels 348a (FIG. 5C) are selectively shifted to become the second foreground pixels 348b (FIG. 5C) having increased luma values.

Figure 6:
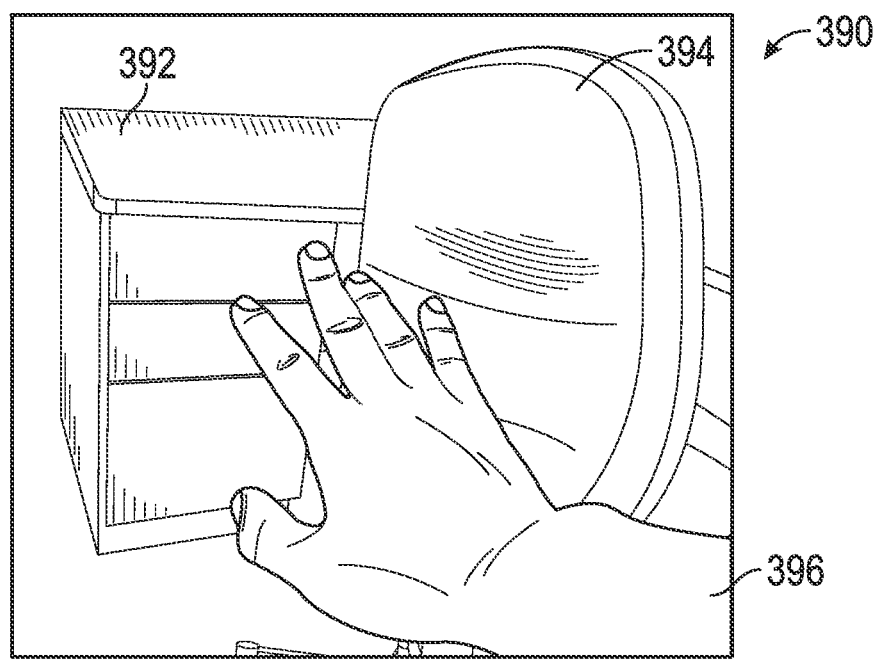
FIG. 6 is a schematic image frame captured using an exposure metering process according to some embodiments.

FIG. 6 is a schematic image frame captured using an exposure metering process according to some embodiments. The exposure metering process calculates exposure conditions based on at least a portion of the background pixels of the image frame, according to various embodiments as described above. Similar to FIG. 1B described above FIG. 6 illustrates an image frame 390 illustrating multiple subjects. Exemplary subjects shown in the frame include a desk 392, a chair 394 and a hand 396 under a typical office lighting environment. Similar to FIG. 1B, FIG. 6 represents a second image frame that is obtained after applying a second exposure condition to a first image frame similar to FIG. 1B, where the second exposure condition is determined by application of an exposure metering process according to embodiments disclosed herein. However, unlike FIG. 1B, the second exposure condition has not rendered the hand 396 overly bright, nor has rendered the chair 392 and the desk 394 overly dark. Instead, by determining an exposure condition using a at least a subset of the background pixels, which, compared to other pixels within the image frame, changes relatively less frequently, the exposure condition has been stabilized and a luma distribution of background pixels (corresponding to the chair 392 and the desk 394) has changed relatively little compared to FIG. 1B, as described above with respect to FIGS. 2A, 2B, and FIGS. 5C-5D. In addition, the foreground pixels (corresponding to the hand 396) have not been rendered overly bright because the luma values have been adjusted, as described above with respect to FIGS. 2A, 2C, and FIGS. 5A-5B. Thus, the image frame 390 has the foreground (the hand 396) and the background (the desk 392 and the chair 396) that have brightness values that are balanced relative to each other.

Figure 7:
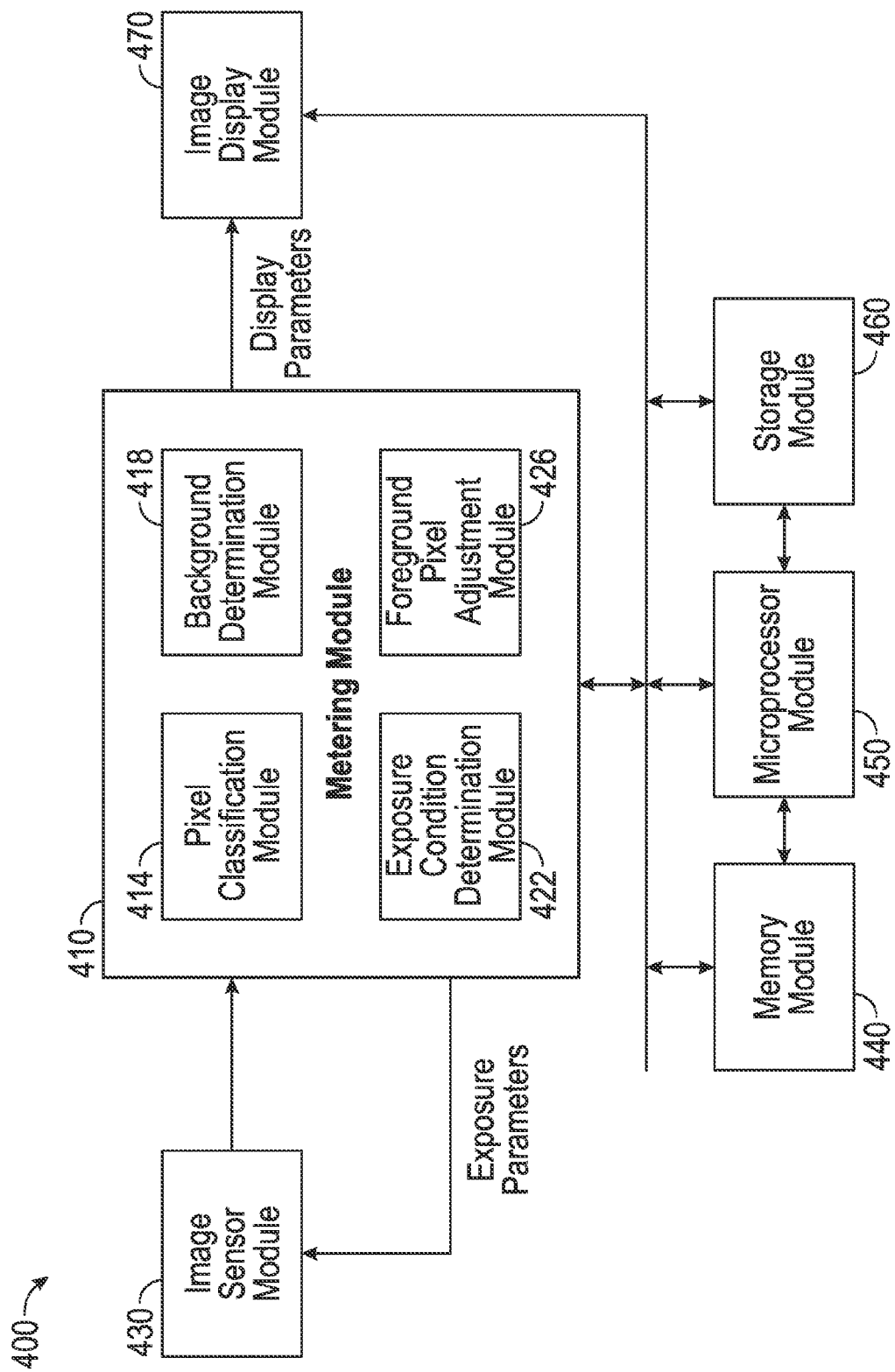
FIG. 7 is a block diagram illustrating a digital imaging apparatus equipped with an exposure metering process according to some embodiments.

FIG. 7 illustrates a functional block diagram illustrating a digital imaging apparatus 400 programmed with an exposure metering process, according to some embodiments. The imaging apparatus 400 includes an image sensing module 430, an exposure metering module 410, and an image display module 470. The exposure metering module 410 in turn includes a pixel classification module 414, a background determination module 418, an exposure condition determination module 422 and foreground pixel adjustment module 426. Each of the modules within the exposure metering module 410 is communicatively connected to a memory module 440, a microprocessor module 450 and a storage module 460. The memory module 440, the microprocessor module 450 and the storage module 460 are communicatively connected to the exposure metering module 410 each other through, for example, a bus.

The image sensing module 430 is configured to absorb photons reflected from objects and convert them into electrical signals for processing, prior to being displayed or stored. The image sensing module 430 comprises an image sensor comprising a plurality of pixels. Each pixel of the image sensor comprises a plurality of photosensitive area, e.g., a photodiode, which is configured to absorb incident photons of light. In some embodiments, incident photons may be directed by a micro lens over each pixel to enhance the quantum efficiency of photon collection. The absorbed photons are converted into electrons, whose number may depend on the energy of the incident photon. The electrons are in turn converted to a voltage signal.

In some embodiments, the image sensing module 430 includes a charge-coupled device (CCD) image sensor. A CCD image sensor comprises a color filter array and a pixel array. Each pixel of a CCD image sensor includes a color filter comprising a pattern of red, green and blue filters. The filtered photons passing through different color filters are absorbed by a photodiode within the pixel array. The photodiode converts the absorbed photons into a charge, and the charge is moved to a single location by applying different voltages to pixels, in a process called charge-coupling. Because the charge in the pixel is moved by applying different voltages, CCD image sensors are supported by external voltage generators.

In some embodiments, the image sensing module 430 includes a complementary metal oxide semiconductor (CMOS) image sensor. Like CCD image sensors, CMOS image sensors include an array of photo-sensitive diodes, one diode within each pixel. Unlike CCDs, however, each pixel in a CMOS imager has its own individual integrated amplifier. In addition, each pixel in a CMOS imager can be read directly in an x-y coordinate system, rather than through movement of a charge. Thus, a CMOS image sensor pixel detects a photon directly and converts it to a voltage, which is outputted.

In some implementations, the image sensing module 430 includes additional circuitry for converting the outputted voltages resulting from an incident photon into digital information. In addition, the image sensing module 430 can further includes an image sensor controller configured to control the image sensor in response to various commands and exposure parameters received from the background-guided metering unit 410.

The exposure metering unit 410 is configured to receive digital information resulting from photons that are absorbed and converted into electrical signals by the image sensing module 430, according to some embodiments. The electrical signals correspond to a plurality of pixels including background pixel regions and foreground pixel regions. The pixel classification module 414 of the background-guided metering unit 410 is configured to classify a subset of the pixels into foreground pixels upon receiving the electrical signals corresponding to the plurality of pixels. The background determination module 418 is configured to subtract the foreground pixels from the image frame to obtain background pixels. The exposure condition determination module 422 is configured to determine an exposure condition for a next image frame using at least a subset of the background pixels. The foreground pixel adjustment module 426 is configured to adjust the foreground pixels such that a difference between a background luma value and a foreground luma value of the next image frame is within a predetermined range. Thus, the exposure metering unit 410 is configured to provide more stable exposure conditions for successive frames based on the background of the image, and is further configured to provide image frames that have foregrounds that are more balanced in brightness relative to the corresponding backgrounds.

The image display module 470 may be configured to display the image frames "real time" under an imaging mode of the digital imaging apparatus 400. The image frames may be displayed, for example, before and after each frame is generated by the image sensing module 430, some of which may be modified by the background-guided metering module through, e.g., foreground pixel adjustment module 426, as described above. The display module 470 may be further configured to display the image frames "off line" while not in an imaging mode of the digital imaging apparatus 400, under which the stored images may be retrieved from the memory module 440 or the storage module 460.

The image display module 470 includes a display device and a display controller. In one embodiment, the display device can include an active matrix organic light-emitting diode (AMOLED) display comprising an active matrix of organic light-emitting diode (OLED) pixels that generate light upon electrical activation. The OLED pixels can be integrated onto a thin film transistor (TFT) array, which functions as a series of switches to control the current flowing to each individual pixel. Other embodiments of the display device are possible, including an LED, LCD, OLED, AMOLED, or any other similar types of displays that can be configured as display device for the digital image apparatus 400.

The digital imaging apparatus 400 further includes the memory module 440 configured to store information while the digital imaging apparatus 400 is powered on. The memory module 440 can be configured to hold information such as fully or partially processed pixel information associated with the image frames at various stages of the operation of the background-guided metering module 410. The memory module 440 can include memory devices such as a static random access memory (SRAM) and a dynamic random access memory (RAM). The memory devices can be configured as different levels of cache memory communicatively coupled to the microprocessor module 450 through a memory bus that provides a data path for flow of data to and from the memory devices and the microprocessor module 450.

The digital imaging apparatus 400 further includes the storage module 470 configured to store media such as photo and video files, as well as software codes. In some embodiments, the storage module 470 is configured to permanently store media even when the digital imaging apparatus 400 is powered off. In some implementations, the storage module 270 includes storage media, such as a hard disk, a nonvolatile memory such as flash memory, read-only memory (ROM), among others.

Implementations disclosed herein provide systems, methods and apparatus for using the device's own display to provide an illumination source for front-facing image sensors. One skilled in the art will recognize that these embodiments may be implemented in hardware, software, firmware, or any combination thereof.

In the description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method implemented on an electronic device for capturing a digital image, comprising:
   receiving an image frame comprising a plurality of pixels captured by an image sensor, the image sensor coupled to a processor;
   subtracting foreground pixels from the image frame to obtain background pixels;
   determining an exposure condition for a next image frame based on at least a subset of the background pixels; and
   adjusting, via the processor, a luma value of foreground pixels of the next image frame such that a difference between a background luma value and a foreground luma value of the next image frame is within a predetermined range of available luma values of the image sensor, wherein the available luma values correspond to the sensitivity of the image sensor.

2. The method of claim 1, wherein determining the exposure condition comprises:
   determining a difference between the background luma value and the foreground luma value;
   when the difference is outside the predetermined range, determining the exposure condition for the next image frame based on the subset of the background pixels and a subset of foreground pixels; and
   when the difference is within the predetermined range, determining the exposure condition for the next image frame based on the subset of the background pixels.

3. The method of claim 1, wherein adjusting the foreground pixels comprises:
   determining that a foreground luma value is greater than the background luma value; and
   selectively adjusting the foreground regions of the gamma curve downwards such that the difference between a background luma value and a foreground luma value of the next image frame is within the predetermined range.

4. The method of claim 1, wherein adjusting the foreground pixels comprises:
   determining that a foreground luma value is less than the background luma value; and
   selectively adjusting the foreground regions of the gamma curve upwards such that the foreground luma value is adjusted upwards such that the difference between a background luma value and a foreground luma value of the next image frame is within the predetermined range.

5. The method of claim 1, wherein determining the exposure condition comprises determining an aperture, a shutter speed, and an ISO speed associated with the electronic device.

6. The method of claim 1, wherein subtracting foreground pixels from the image frame comprises identifying a foreground subject of the image frame, predicting a movement path of the foreground subject, and subtracting pixels corresponding to the foreground subject sweeping through the movement path.

7. A digital image-capturing apparatus, comprising:
   an image sensor configured to capture an image frame comprising a plurality of pixels; and
   a processor coupled to the image sensor and configured to:
   subtract foreground pixels from the image frame to obtain background pixels;
   determine an exposure condition for a next image frame based on at least a subset of the background pixels; and
   selectively adjust a luma value of foreground pixels of the next image frame such that a difference between a background luma value and a foreground luma value of the next image frame is within a predetermined range of available luma values of the image sensor, wherein the available luma values correspond to the sensitivity of the image sensor.

8. The apparatus of claim 7, wherein the processor is further configured to:
  determine a difference between the background luma value and the foreground luma value;
  when the difference is outside the predetermined range, determine the exposure condition for the next image frame based on the subset of the background pixels and a subset of foreground pixels; and
  when the difference is within the predetermined range, determine the exposure condition for the next image frame based on the subset of the background pixels.

9. The apparatus of claim 7, wherein the processor is further configured to:
  determine that a foreground luma value is greater than the background luma value; and
  selectively adjust the foreground regions of the gamma curve downwards such that the difference between a background luma value and a foreground luma value of the next image frame is within the predetermined range.

10. The apparatus of claim 7, wherein the processor is further configured to:
  determine that a foreground luma value is less than the background luma value; and
  selectively adjust the foreground regions of the gamma curve upwards such that the foreground luma value is adjusted upwards such that the difference between a background luma value and a foreground luma value of the next image frame is within the predetermined range.

11. The method of claim 7, wherein the processor is further configured to determine an aperture, a shutter speed, and an ISO speed associated with digital image-capturing apparatus.

12. The method of claim 7, wherein the processor is further configured to subtract foreground pixels from the image frame by identifying a foreground subject of the image frame, predicting a movement path of the foreground subject, and subtracting pixels corresponding to the foreground subject sweeping through the movement path.

13. A non-transitory computer-readable medium comprising instructions that when executed cause a processor to perform the following steps:
  receiving an image frame comprising a plurality of pixels captured by an image sensor;
  subtracting foreground pixels from the image frame to obtain background pixels;
  determining an exposure condition for a next image frame based on at least a subset of the background pixels; and
  adjusting a luma value of foreground pixels of the next image frame such that a difference between a background luma value and a foreground luma value of the next image frame is within a predetermined range of available luma values of the image sensor, wherein the available luma values correspond to the sensitivity of the image sensor.

14. The non-transitory computer-readable medium of claim 13, wherein determining the exposure condition comprises:
  determining a difference between the background luma value and the foreground luma value;
  when the difference is outside the predetermined range, determining the exposure condition for the next image frame based on the subset of the background pixels and a subset of foreground pixels; and
  when the difference is within the predetermined range, determining the exposure condition for the next image frame based on the subset of the background pixels.

15. The non-transitory computer-readable medium of claim 13, wherein adjusting the foreground pixels comprises:
  determining that a foreground luma value is greater than the background luma value; and
  selectively adjusting the foreground regions of the gamma curve downwards such that the difference between a background luma value and a foreground luma value of the next image frame is within the predetermined range.

16. The non-transitory computer-readable medium of claim 13, wherein adjusting the foreground pixels comprises:
  determining that a foreground luma value is less than the background luma value; and
  selectively adjusting the foreground regions of the gamma curve upwards such that the foreground luma value is adjusted upwards such that the difference between a background luma value and a foreground luma value of the next image frame is within the predetermined range.

17. The non-transitory computer-readable medium of claim 13, wherein determining the exposure condition comprises determining an aperture, a shutter speed, and an ISO speed associated with a digital imaging apparatus.

18. The non-transitory computer-readable medium of claim 13, wherein subtracting foreground pixels from the image frame comprises identifying a foreground subject of the image frame, predicting a movement path of the foreground subject, and subtracting pixels corresponding to the foreground subject sweeping through the movement path.

19. A digital image-capturing system, comprising:
  means for capturing an image frame comprising a plurality of pixels;
  means for subtracting foreground pixels from the image frame to obtain background pixels;
  means for determining an exposure condition for a next image frame based on at least a subset of the background pixels; and
  means for adjusting a luma value of foreground pixels of the next image frame such that a difference between a background luma value and a foreground luma value of the next image frame is within a predetermined range of available luma values of the means for capturing, wherein the available luma values correspond to the sensitivity of the means for capturing.

20. The system of claim 19, wherein the means for determining an exposure condition is configured to:
  determine a difference between the background luma value and the foreground luma value;
  when the difference is outside the predetermined range, determine the exposure condition for the next image frame based on the subset of the background pixels and a subset of foreground pixels; and
  when the difference is within the predetermined range, determine the exposure condition for the next image frame based on the subset of the background pixels.

21. The system of claim 19, wherein the means for adjusting the foreground pixels is configured to:
  determine that a foreground luma value is greater than the background luma value; and
  selectively adjust the foreground regions of the gamma curve downwards such that the difference between a background luma value and a foreground luma value of the next image frame is within the predetermined range.

22. The system of claim 19, wherein the means for adjusting the foreground pixels is configured to:
determine that a foreground luma value is less than the background luma value; and
selectively adjust the foreground regions of the gamma curve upwards such that the foreground luma value is adjusted upwards such that the difference between a background luma value and a foreground luma value of the next image frame is within the predetermined range.

23. The system of claim 19, wherein the exposure condition determination module is configured to determine an aperture, a shutter speed, and an ISO speed associated with digital image-capturing apparatus.

24. The system of claim 19, wherein the background determination module configured subtract foreground pixels from the image frame by identifying a foreground subject of the image frame, predicting a movement path of the foreground subject, and subtracting pixels corresponding to the foreground subject sweeping through the movement path.

* * * * *